(12) United States Patent
Chung et al.

(10) Patent No.: US 11,038,967 B2
(45) Date of Patent: Jun. 15, 2021

(54) ENABLING HYPERTEXT TRANSFER PROTOCOL (HTTP) CONNECT IN ASSOCIATION WITH A TOLL-FREE DATA SERVICE

(71) Applicant: Verizon Patent and Licensing Inc., Arlington, VA (US)

(72) Inventors: Jae Won Chung, Lexington, MA (US); Jian Huang, Sudbury, MA (US); Lalith Kumar B Sesham, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 649 days.

(21) Appl. No.: 15/416,081

(22) Filed: Jan. 26, 2017

(65) Prior Publication Data

US 2018/0213038 A1    Jul. 26, 2018

(51) Int. Cl.
*G06F 15/16* (2006.01)
*H04L 29/08* (2006.01)
(Continued)

(52) U.S. Cl.
CPC ........ *H04L 67/141* (2013.01); *H04L 12/1471* (2013.01); *H04L 12/1475* (2013.01);
(Continued)

(58) Field of Classification Search
CPC ............... H04L 67/141; H04L 12/1471; H04L 12/1475; H04L 12/1496; H04L 63/00;
(Continued)

(56) References Cited

U.S. PATENT DOCUMENTS

| 7,080,158 B1 * | 7/2006 | Squire | H04L 67/2814 |
| | | | 370/389 |
| 9,060,273 B2 * | 6/2015 | Brown | H04W 4/029 |

(Continued)

FOREIGN PATENT DOCUMENTS

EP    2642778 A1 *    9/2013    ............ H04W 4/185

OTHER PUBLICATIONS

IEEE Standard for the Functional Architecture of Next Generation Service Overlay Networks IEEE Std 1903-2011 Year: 2011 | Standard | Publisher: IEEE (Year: 2011).*

(Continued)

*Primary Examiner* — Oscar A Louie
*Assistant Examiner* — Oluwatosin M Gidado

(57) ABSTRACT

A device can receive, from a user device, a hypertext transfer protocol (HTTP) CONNECT request associated with a toll-free data service. The user device can establish a first transmission control protocol (TCP) connection with a proxy server. The HTTP CONNECT request can request the proxy server to establish a second TCP connection with a content provider server. The device can determine, based on the HTTP CONNECT request, that an authorization condition is satisfied. The device can store information associated with a flow between the user device and the content provider server. The user device and the content provider server can establish a transport layer security (TLS) connection based on the first TCP connection and the second TCP connection. The device can provide the information associated with the flow to permit an account of an entity to be adjusted in association with the toll-free data service.

20 Claims, 11 Drawing Sheets

(51) Int. Cl.
  *H04L 12/14* (2006.01)
  *H04W 4/24* (2018.01)
  *H04L 29/06* (2006.01)
  *H04W 12/08* (2021.01)
  *H04M 15/00* (2006.01)

(52) U.S. Cl.
  CPC .......... *H04L 12/1496* (2013.01); *H04L 63/00* (2013.01); *H04L 63/0281* (2013.01); *H04L 63/102* (2013.01); *H04L 67/02* (2013.01); *H04L 67/2809* (2013.01); *H04M 15/09* (2013.01); *H04W 4/24* (2013.01); *H04W 12/08* (2013.01); *H04L 69/161* (2013.01)

(58) Field of Classification Search
  CPC ... H04L 63/0281; H04L 63/102; H04L 67/02; H04L 67/2809; H04L 69/161; H04L 12/14; H04L 12/1403; H04L 63/10; H04L 63/08; H04L 12/22; H04L 29/06047; H04L 41/0896; H04M 15/09; H04W 12/08; H04W 4/24
  USPC ........................................................ 709/228
  See application file for complete search history.

(56) References Cited

U.S. PATENT DOCUMENTS

| | | | | |
|---|---|---|---|---|
| 2003/0084175 A1* | 5/2003 | Kaniyar | ................ | H04L 69/28 709/230 |
| 2005/0102381 A1* | 5/2005 | Jiang | ................ | H04L 63/101 709/220 |
| 2005/0182697 A1* | 8/2005 | Rao | ................ | G06Q 10/087 705/28 |
| 2007/0250560 A1* | 10/2007 | Wein | ................ | H04L 67/1008 709/201 |
| 2008/0069122 A1* | 3/2008 | Matsuoka | ........... | H04L 67/2814 370/401 |
| 2011/0019574 A1* | 1/2011 | Malomsoky | ........ | H04L 47/2441 370/252 |
| 2011/0252462 A1* | 10/2011 | Bonanno | ............. | H04L 63/083 726/7 |
| 2011/0307889 A1* | 12/2011 | Moriki | ............... | G06F 9/45558 718/1 |
| 2012/0191628 A1* | 7/2012 | Bugenhagen | ....... | H04L 41/5022 705/400 |
| 2013/0031356 A1* | 1/2013 | Prince | ................ | H04L 63/0823 713/151 |
| 2013/0041932 A1* | 2/2013 | Moore | ...................... | H04L 1/08 709/203 |
| 2013/0173712 A1* | 7/2013 | Monjas Llorente | ... | G06Q 10/00 709/204 |
| 2014/0101291 A1* | 4/2014 | Johnston | ............... | G06F 16/958 709/219 |
| 2015/0127736 A1* | 5/2015 | Clinton | ................... | H04L 67/10 709/204 |
| 2015/0249627 A1* | 9/2015 | Jimenez | ................ | H04L 51/066 709/206 |
| 2015/0264014 A1* | 9/2015 | Budhani | ............. | H04L 63/0281 726/12 |
| 2016/0315846 A1* | 10/2016 | Xu | ........................ | H04L 45/021 |
| 2017/0163694 A1* | 6/2017 | Skuratovich | .......... | H04L 65/602 |
| 2018/0198796 A1* | 7/2018 | Chien | ................... | H04L 63/101 |

OTHER PUBLICATIONS

Web Services: Software-as-a-Service (SaaS), Communication, and Beyond Wu Chou 2008 IEEE Congress on Services Part II (services-2 2008) (Year: 2008).*

\* cited by examiner

ENABLING HYPERTEXT TRANSFER PROTOCOL (HTTP) CONNECT IN ASSOCIATION WITH A TOLL-FREE DATA SERVICE

BACKGROUND

Content providers, such as online media companies, can wish to deliver content to network users. Some content providers can choose to subsidize the cost of network data usage which would otherwise be paid by the network users accessing the content.

DETAILED DESCRIPTION OF PREFERRED EMBODIMENTS

Figure 1A:
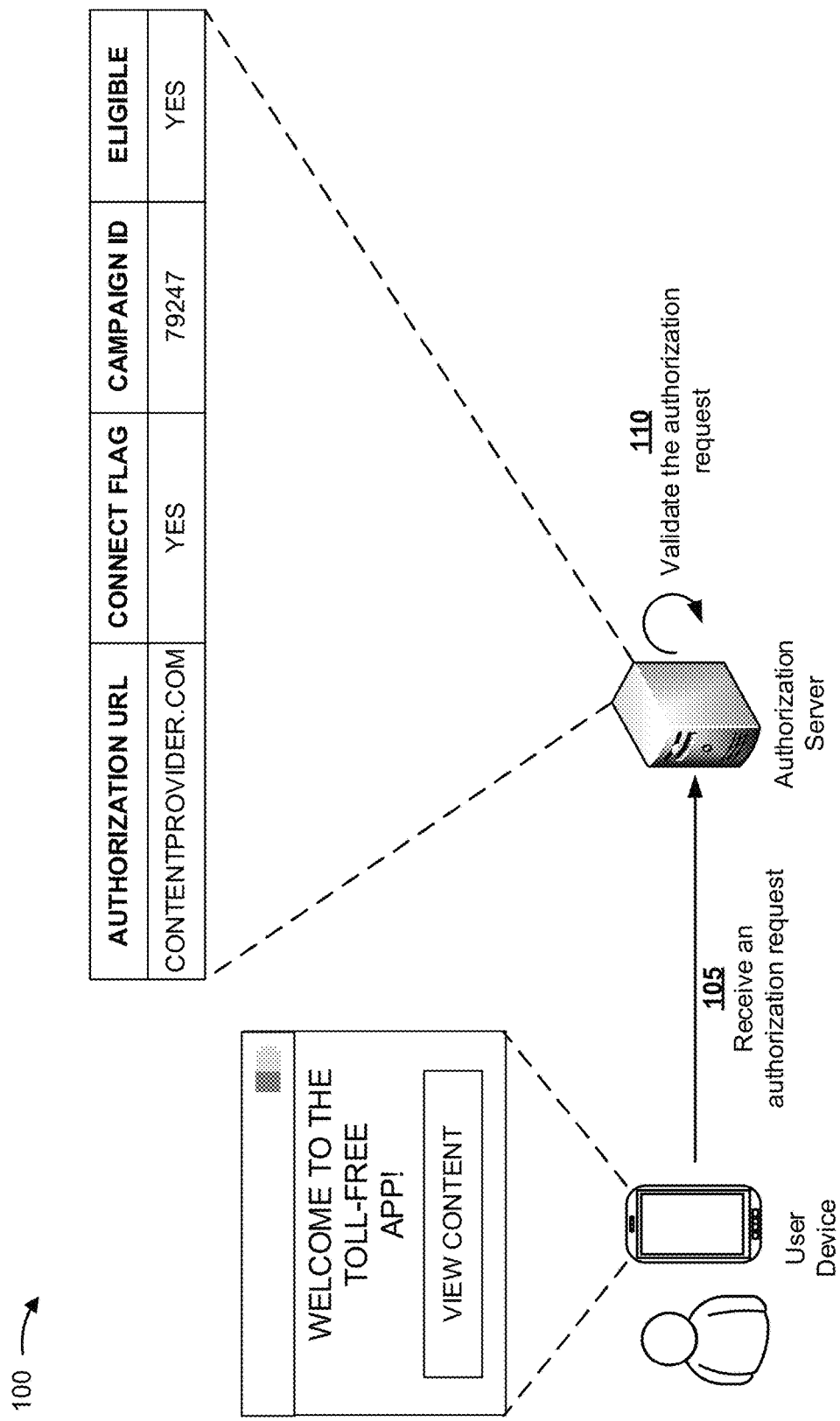
FIGS. 1A-1G are diagrams of an overview of an example implementation described herein.

The following detailed description of example implementations refers to the accompanying drawings. The same reference numbers in different drawings can identify the same or similar elements.

A content provider can want to provide content (e.g., streaming video and/or audio content, a webpage, a document, an image, or the like) to a network user. The content provider can want to subsidize the cost of network data usage associated with the content, which would ordinarily be charged to an account of the network user. A network operator can want to ensure that network data usage is charged to an account of the appropriate entity (e.g., either the content provider or the network user). One way to ensure appropriate charges is to convert a non-toll free resource identifier (e.g., a uniform resource identifier, such as a uniform resource locator (URL)) for a resource to a toll-free resource identifier. In this way, network devices can identify network data usage associated with toll-free resource identifiers, thereby enabling the network operator to adjust an account of the appropriate entity for network data usage.

In some cases, a user device can connect to a content provider server via a proxy server (e.g., to increase security, to enhance performance of the connection, or the like). For example, the user device (e.g., a client application executing on a smartphone) can use an HTTP CONNECT method to establish a connection with a content provider server via a proxy server. For example, HTTP CONNECT includes a method, used by a user device, that instructs a proxy server to establish a Transmission Control Protocol (TCP) connection with a remote server (e.g., a server-side TCP connection) and forward network traffic between the server-side TCP connection and a client-side TCP connection (e.g., associated with the user device and the proxy server). Based on the TCP connections, the user device and the remote server can implement Transport Layer Security (TLS) to establish a secure end-to-end connection (e.g., a TLS connection). In this way, the user device and the remote server can tunnel network traffic through the proxy server. Additionally, in this way, privacy and/or security of the connection between the user device and the remote server can be increased as compared to if a TLS connection is not established.

However, if the user device implements the HTTP CONNECT method, then network devices can be incapable of identifying and/or examining underlying network traffic associated with the TLS connection. For example, the user device and/or the remote server can encrypt and decrypt the underlying network traffic, thereby preventing network devices from identifying the content of the network traffic and/or identifying that the network traffic is associated with a toll-free data service. Thereby, if the remote server is associated with a toll-free data service, then the network operator cannot be capable of charging the appropriate entity for network data usage.

Implementations described herein enable a user device to establish a TLS connection with a content provider server via a proxy server (e.g., based on an HTTP CONNECT request). Additionally, implementations described herein enable a network device to identify that an HTTP CONNECT request is associated with a toll-free data service, monitor network data usage associated with the TLS connection, and provide information associated with the network data usage to permit an account of an appropriate entity to be adjusted (e.g., charge an appropriate entity, or the like). In this way, implementations described herein enable the HTTP CONNECT method to be used in association with a toll-free data service.

Implementations described herein reduce a number of network authorizations associated with the network data usage. For example, network devices can authorize a content request (e.g., based on signaling messages), and a particular network device can monitor information associated with a flow between a user device and a content provider server that is established based on the signaling messages. In this way, implementations described herein enable a network device to authorize a single request, rather than authorizing multiple requests for content associated with a toll-free data service. Additionally, implementations described herein enable a user device to provide a single authorization request rather than providing multiple authorization requests. In this way, implementations described herein conserve user device and network device processor and/or memory resources, and/or conserve network resources.

FIGS. 1A-1G are diagrams of an overview of an example implementation 100 described herein. As shown in FIG. 1A, example implementation 100 can include a user device and an authorization server. As shown by reference number 105, the authorization server can receive an authorization request from the user device. For example, the user device can execute a toll-free data service application, and provide the authorization request to the authorization server via an application programming interface (API). The authorization request can be associated with information that identifies a resource identifier (e.g., an authorization URL associated with a content provider server), a connect flag (e.g., information identifying that the user device is requesting use of an HTTP CONNECT method), and a campaign identifier (e.g., information identifying a toll-free data service campaign associated with the content provider).

As shown by reference number 110, the authorization server can validate the authorization request. For example, the authorization server can validate the authorization request based on a set of campaign rules, such as information that identifies whether the toll-free data service campaign is valid, whether user devices can use HTTP CONNECT in association with the toll-free data service campaign, or the like.

Figure 1B:
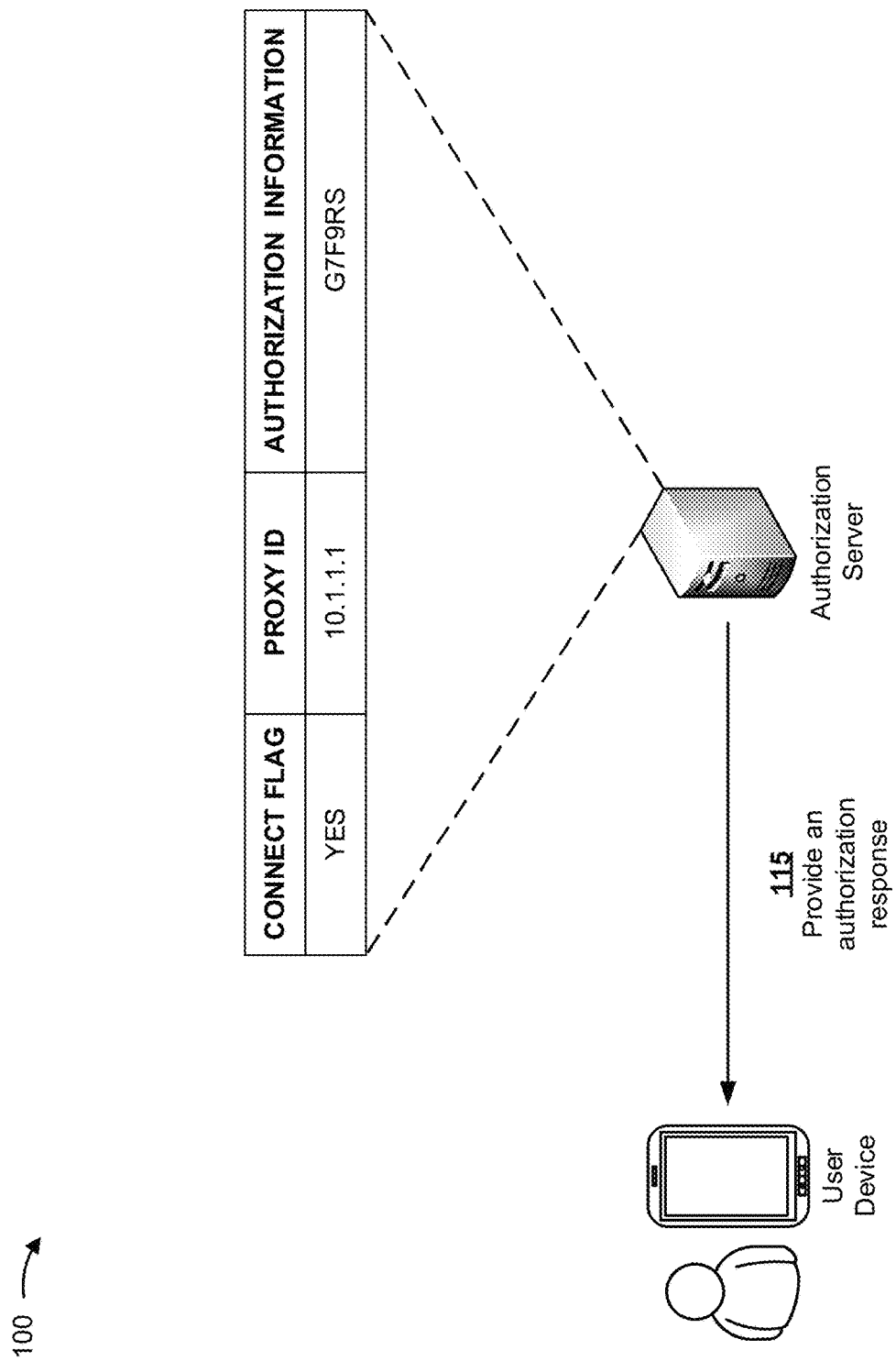

As shown in FIG. 1B, and by reference number 115, the authorization server can provide, to the user device, an authorization response. For example, the authorization response can include information that identifies a proxy server (e.g., a network address of the proxy server, such as an Internet Protocol (IP) address), and include authorization information, such as information that identifies that the toll-free data service campaign is valid and/or that the user device is eligible to participate in the toll-free data service campaign.

Figure 1C:
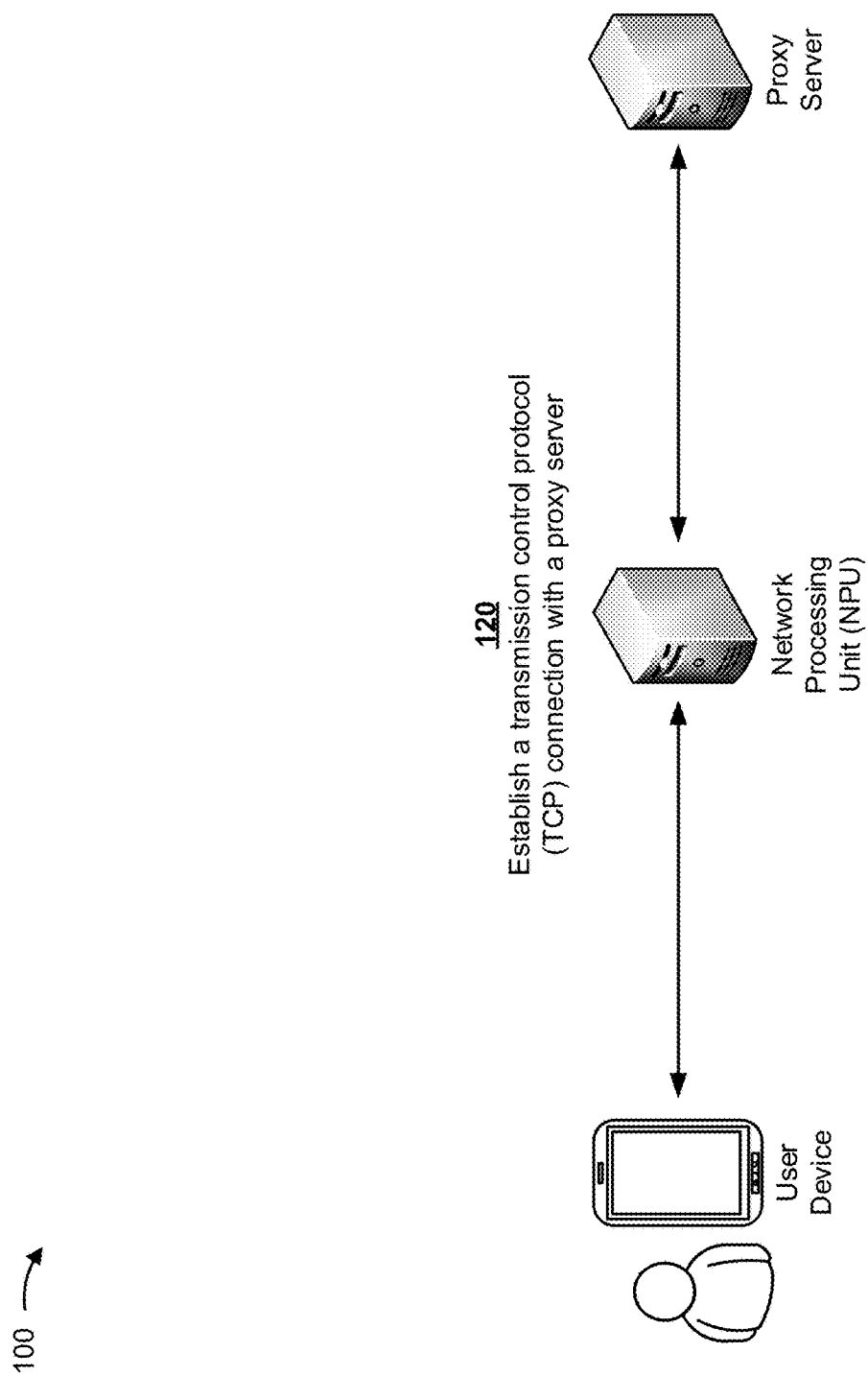

As shown in FIG. 1C, example implementation 100 can further include a network processing unit (NPU) (e.g., a network device, such as a server) and a proxy server. As shown by reference number 120, the user device can initiate a TCP connection with the proxy server based on the authorization response. For example, the user device can identify the network address of the proxy server based on the authorization response, and provide TCP signaling messages to the proxy server. In some implementations, the user device and the proxy server can establish a TCP connection based on exchanging TCP signaling messages (e.g., perform a three-way handshake procedure). In some implementations, the NPU can receive, from the user device, the TCP signaling messages, and provide the TCP signaling messages to the proxy server.

Figure 1D:
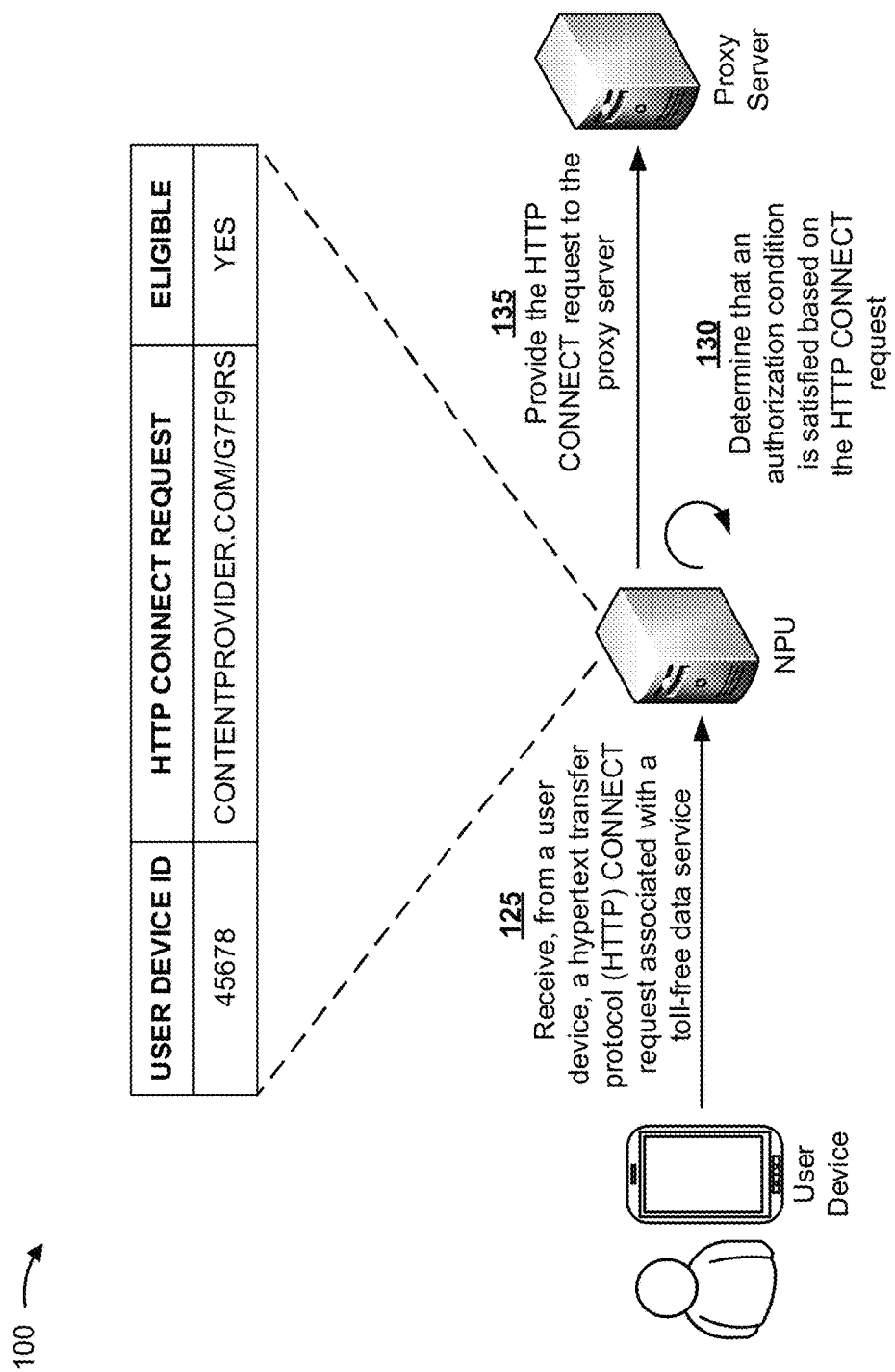

As shown in FIG. 1D, and by reference number 125, the NPU can receive, from the user device, an HTTP CONNECT request associated with a toll-free data service. For example, the user device can provide the HTTP CONNECT request based on establishing the TCP connection with the proxy server. In some implementations, the HTTP CONNECT request can include an instruction for the proxy server to establish a TCP connection with a content provider server (e.g., to facilitate the establishment of a TLS connection between the user device and the content provider server). Additionally, or alternatively, the HTTP CONNECT request can include information that identifies the URL associated with the content provider server, and/or include authorization information (e.g., information that the user device received from the authorization server).

As shown by reference number 130, the NPU can determine that an authorization condition is satisfied based on the HTTP CONNECT request. For example, as described elsewhere herein, the NPU can determine that the authorization condition is satisfied based on information associated with the HTTP CONNECT request (e.g., based on the authorization information associated with the request, based on a user device identifier of the user device, or the like). As shown by reference number 135, the NPU can provide the HTTP CONNECT request to the proxy server.

Figure 1E:
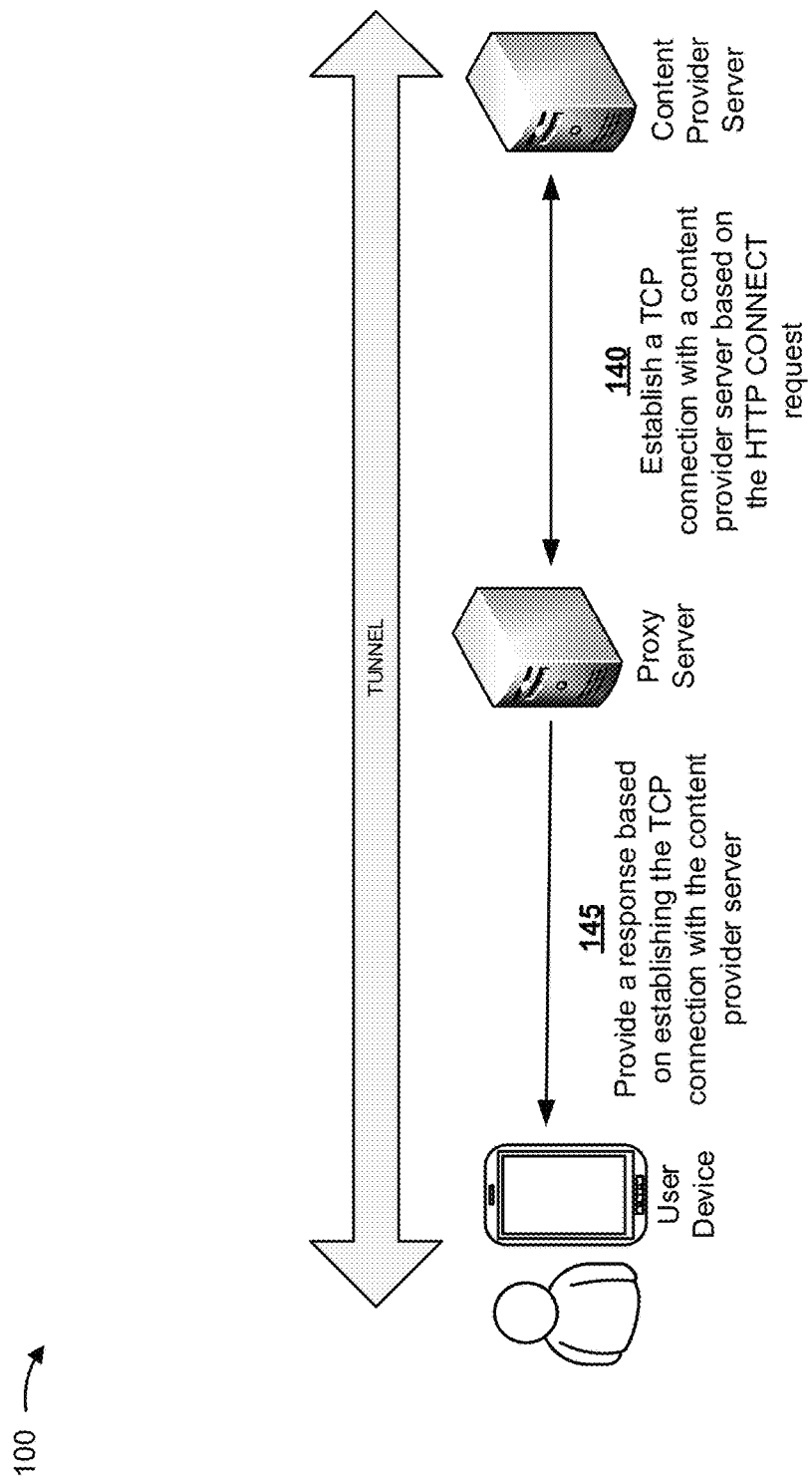

As shown in FIG. 1E, example implementation 100 can further include a content provider server. As shown by reference number 140, the proxy server can establish a TCP connection with the content provider server based on the HTTP CONNECT request. For example, the proxy server can identify the URL associated with the HTTP CONNECT request, identify a network address of the content provider server based on the URL, and exchange TCP signaling messages with the content provider server. As shown by reference number 145, the proxy server can provide, to the user device, a response based on establishing the TCP connection with the content provider server (e.g., an HTTP 200 OK message). In some implementations, the user device and the content provider server can establish a TLS connection based on the TCP connection between the user device and the proxy server and the TCP connection between the proxy server and the content provider server (e.g., establish a tunnel, such as a secure end-to-end connection between the user device and the content provider server).

Figure 1F:
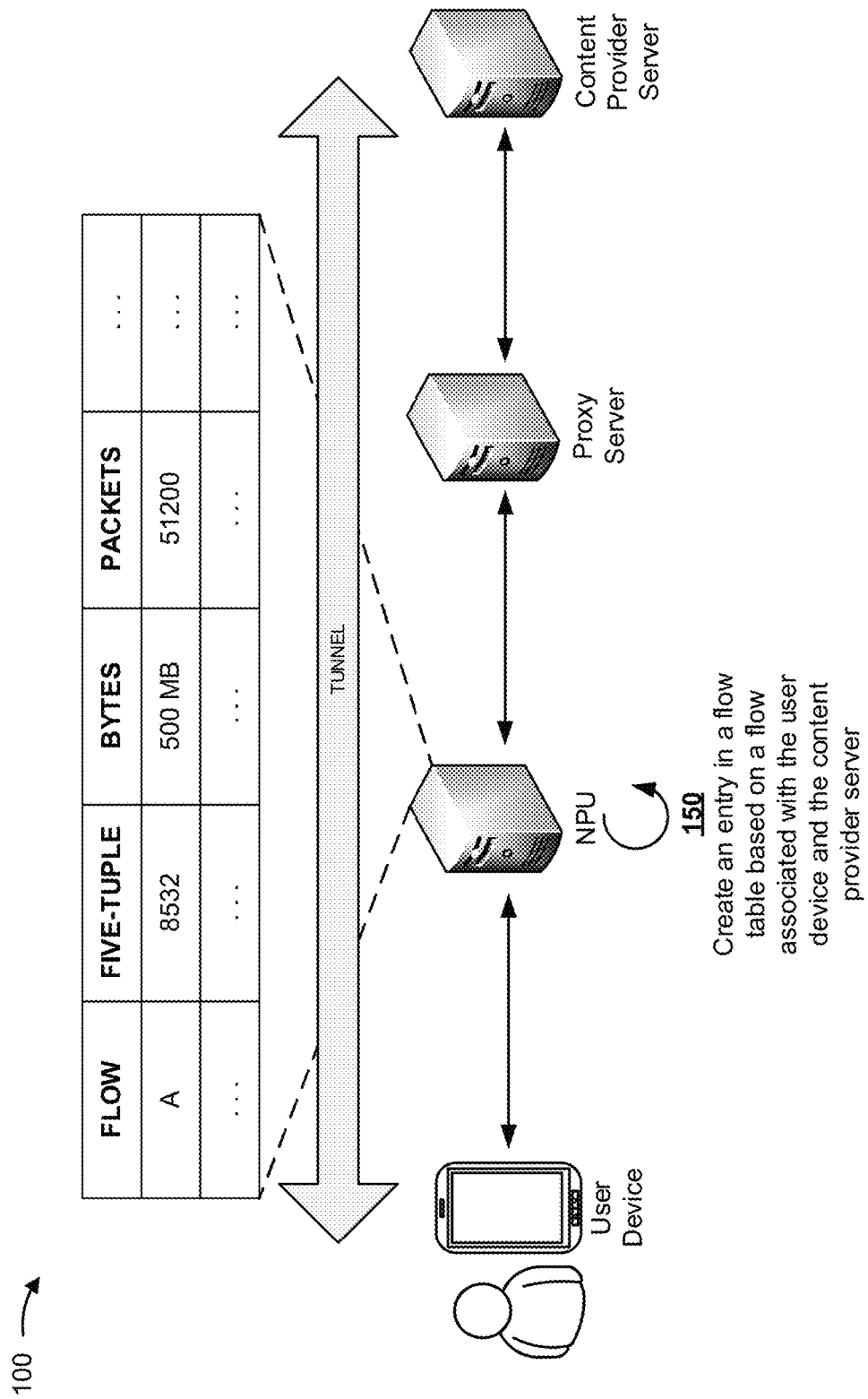

As shown in FIG. 1F, and by reference number 150, the NPU can create an entry in a flow table based on a flow associated with the user device and the content provider server. For example, a flow can include a sequence of packets that include one or more shared values (e.g., shared five-tuple information, such as a source address, a source port, a destination address, a destination port, and a protocol). In some implementations, the NPU can create an entry in a data structure (e.g., a flow table) based on providing the HTTP CONNECT request to the content provider server. In some implementations, an entry can include hashed five-tuple information, a byte count, a packet count, and/or other information associated with a flow.

Figure 1G:
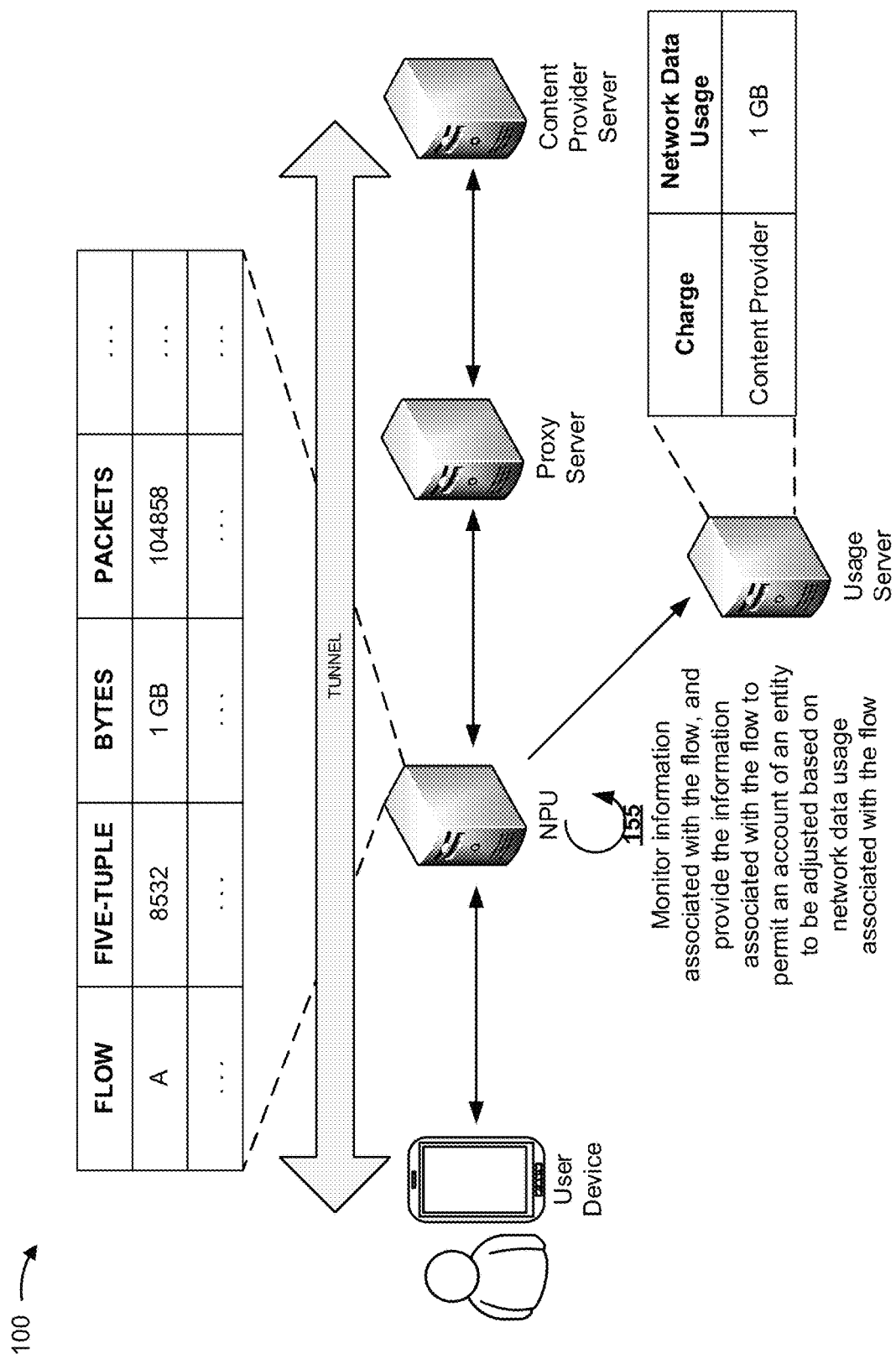

As shown in FIG. 1G, and by reference number 155, the NPU can monitor information associated with the flow, and provide, to a usage server (e.g., a network device) the information associated with the flow to permit an account of entity (e.g., the content provider) to be adjusted based on network data usage associated with the flow. For example, the NPU can monitor the flow based on updating values associated with the entry in the flow table (e.g., the byte count, the packet count, etc.), and can provide the information to the usage server (e.g., a flow record).

In this way, the NPU can identify network traffic that is associated with a toll-free data service, despite the NPU being incapable of examining the underlying network traffic. For example, the NPU can determine that a connection between the user device and the content provider server is associated with a toll-free data service (e.g., based on the HTTP CONNECT request), create the entry in the flow table (e.g., that includes five-tuple information associated with the user device and the content provider server), and identify network traffic that includes the five-tuple information. In this way, the NPU can monitor network traffic associated with the TLS connection between the user device and the content provider server based on five-tuple information, and provide, to a usage server, information that permits an account of an entity to be adjusted based on network data usage associated with the TLS connection.

In this way, implementations described herein enable a user device to establish a connection with a content provider server via a proxy server, and establish a TLS connection with the content provider server, thereby increasing security and/or privacy of the connection as compared to situations where TLS and/or a proxy server are not implemented. Additionally, implementations described herein reduce a number of authorization requests associated with a toll-free data service. For example, a user device can receive authorization information from an authorization server based on providing a single authorization request, and provide the authorization information to a network device in association with an HTTP CONNECT request. The network device can determine that the HTTP CONNECT request is associated with a toll-free data service based on the authorization information, and monitor information associated with a flow between the user device and the content provider server (e.g., to permit an account of an entity to be adjusted for the network data usage). In this way, implementations described herein conserve user device and/or network device processor and/or memory resources, and/or conserve network resources by enabling the authorization of a single request rather than requiring the authorization of multiple HTTP requests.

As indicated above, FIGS. 1A-1G are provided merely as an example. Other examples are possible and can differ from what was described with regard to FIGS. 1A-1G.

Figure 2:
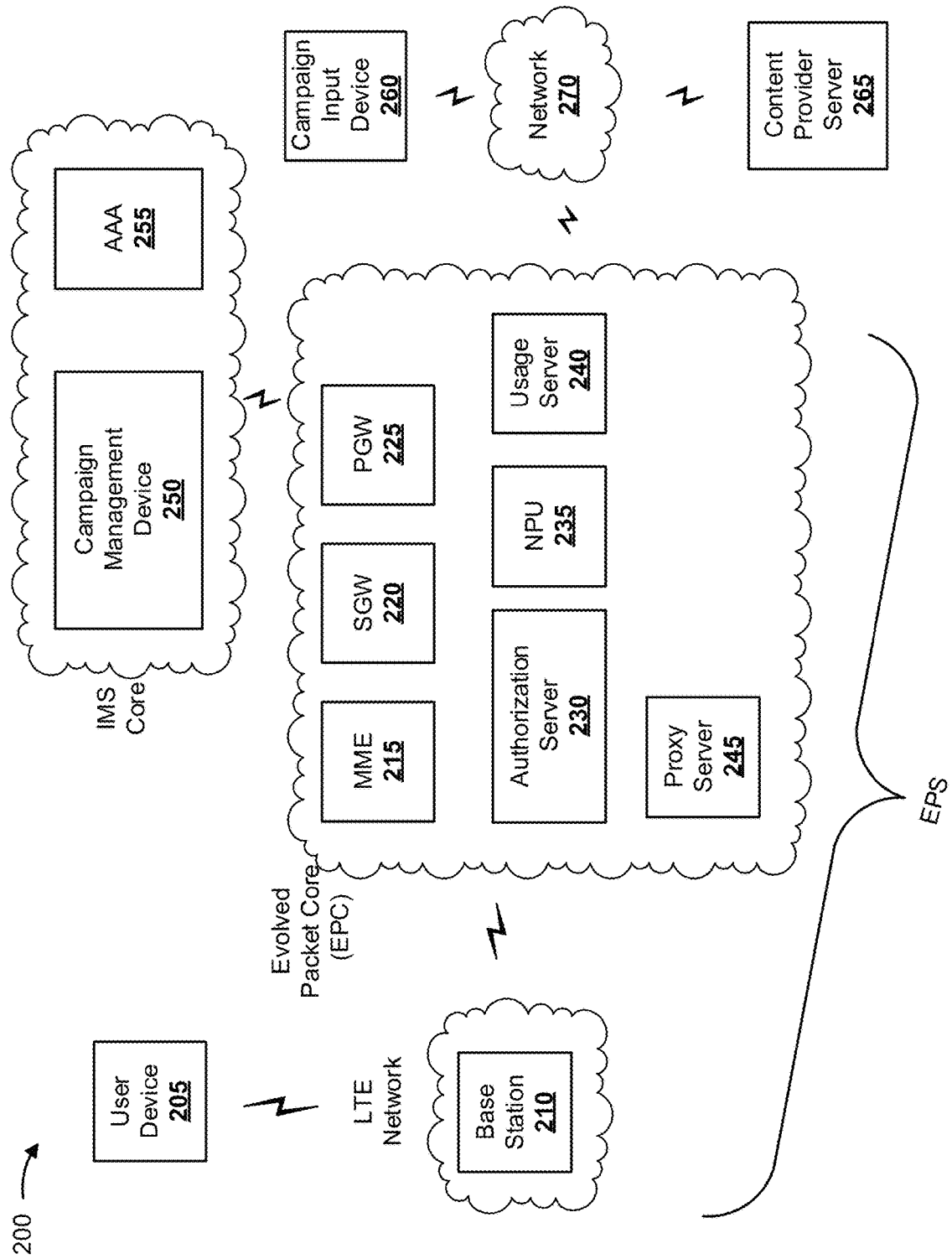
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include an user device 205, a base station 210, a mobility management entity device (MME) 215, a serving gateway (SGW) 220, a packet data network gateway (PGW) 225, an authorization server 230, a network processing unit (NPU) 235, a usage server 240, a proxy server 245, a campaign management device 250, an authentication, authorization, and accounting server (AAA) 255, a campaign input device 260, a content provider server 265, and a network 270. Devices of environment 200 can interconnect via wired connections, wireless connections, or a combination of wired and wireless connections.

User device 205 includes one or more devices capable of communicating with base station 210 and/or a network (e.g., network 270). User device 205 can include one or more devices capable of receiving, generating, storing, processing, and/or providing information associated with a toll-free data service. For example, user device 205 can include a computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device. In some implementations, user device 205 can be associated with an account that is adjusted based on network data usage by user device 205. User device 205 can send traffic to and/or receive traffic from network 270 (e.g., via base station 210, SGW 220, and/or PGW 225).

Base station 210 includes one or more devices capable of communicating with user device 205 using a cellular radio access technology. For example, base station 210 can include a base transceiver station, a radio base station, a node B, an evolved node B (eNB), a base station subsystem, a cellular site, a cellular tower (e.g., a cell phone tower, a mobile phone tower, etc.), a radio access node, a macrocell base station, a microcell base station, a picocell base station, a femtocell base station, or a similar type of device. Base station 210 can transfer traffic between user device 205 and network 270. In some implementations, base station 210 can communicate with user device 205 (and/or one or more other devices) using radio waves.

MME 215 includes one or more devices, such as one or more servers, capable of managing authentication, activation, deactivation, and mobility functions associated with user device 205. In some implementations, MME 215 can perform operations relating to authentication of user device 205. Additionally, or alternatively, MME 215 can facilitate the selection of a particular SGW 220 and/or a particular PGW 225 to serve traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

SGW 220 includes one or more devices capable of routing network traffic (e.g., packets). For example, SGW 220 can include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 220 can aggregate traffic received from one or more base stations 210 associated with the Long Term Evolution (LTE) network, and can send the aggregated traffic to network 270 (e.g., via PGW 225) and/or other network devices associated with the Evolved Packet Core (EPC) and/or the IP Multimedia Subsystem (IMS) core. SGW 220 can also receive traffic from network 270 and/or other network devices, and can send the received traffic to user device 205 via base station 210. Additionally, or alternatively, SGW 220 can perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 can aggregate traffic received from one or more SGWs 220, and can send the aggregated traffic to network 270. Additionally, or alternatively, PGW 225 can receive traffic from network 270, and can send the traffic to user device 205 via SGW 220 and base station 210. PGW 225 can record data usage information (e.g., byte usage), and can provide the data usage information to AAA 255.

Authorization server 230 includes one or more devices capable of receiving, processing, storing, generating, and/or providing information associated with a toll-free data service. For example, authorization server 230 can include a gateway, a router, a modem, a switch, a firewall, a NIC, a hub, a bridge, a server device, an OADM, or a similar device. Authorization server 230 can receive information associated with a toll-free campaign from campaign management device 250, apply the information to traffic received from PGW 225, and instruct PGW 225 how to handle the traffic based on information received from campaign management device 250. Additionally, or alternatively, authorization server 230 can instruct AAA 255 on which account to update for network data usage associated with the traffic. Different authorization servers 230 can be associated with different geographic regions and/or cellular service areas, in some implementations.

In some implementations, authorization server 230 can receive, from campaign input device 260, information regarding registering a resource identifier associated with particular content. Additionally, or alternatively, authorization server 230 can receive an authorization request associated with the resource identifier, and provide authorization information to user device 205.

NPU 235 includes one or more devices capable of receiving, processing, storing, generating, and/or providing information associated with a toll-free data service. For example, NPU 235 can include a server device (e.g., a host server, a web server, an application server, etc.), a cloud computing device, or a similar device. In some implementations, NPU 235 can receive, from user device 205, an HTTP CONNECT request, and create an entry in a flow table based on the HTTP CONNECT request. Additionally, or alternatively, NPU 235 can monitor information associated with a flow between user device 205 and content provider server 265.

Usage server 240 includes one or more devices capable of storing information associated with network data usage. For example, usage server 240 can include a server device (e.g., a host server, a web server, an application server, etc.), a cloud computing device, or a similar device. In some implementations, usage server 240 can receive, from NPU 235, information associated with a flow (e.g., a flow record).

Proxy server 245 includes one or more devices capable of receiving, storing, processing, controlling, and/or providing information associated with an HTTP CONNECT request. For example, proxy server 245 can include a server device, a cloud computing device, or a similar device. In some implementations, proxy server 245 can receive network traffic from content provider server 265 (e.g., via network 270) and provide the network traffic to user device 205 (e.g., via base station 210), and/or can receive network traffic from user device 205 (e.g., via base station 210) and provide the network traffic to content provider server 265 (e.g., via network 270).

Campaign management device 250 includes one or more devices capable of receiving, generating, storing, processing, and/or providing information associated with a toll-free data service campaign (e.g., campaign information, or the like). For example, campaign management device 250 can include a server device or a similar device. Campaign management device 250 can receive campaign information from campaign input device 260 (e.g., one or more resource identifiers associated with the campaign, a storage location of one or more files associated with the resource identifiers, etc.), generate campaign rules based on the campaign information, and deploy the campaign rules to one or more authorization servers 230 (e.g., associated with one or more cellular service areas).

AAA 255 includes one or more devices, such as one or more server devices, that perform authentication, authorization, and/or accounting operations for communication sessions associated with user device 205. For example, AAA 255 can store data usage information for user device 205, for a user associated with user device 205, for content provider server 265, for a content provider (e.g., that provides a toll-free data service), etc.

Campaign input device 260 includes one or more devices capable of receiving, generating, storing, processing, and/or providing information associated with a toll-free data service campaign. For example, campaign input device 260 can include a desktop computer, a laptop computer, a mobile phone, a server device, or a similar device. Campaign input device 260 can receive input, from a content provider, that identifies campaign information, and provide the campaign information to campaign management device 250. In some implementations, a content provider can input, via campaign input device 260, one or more resource identifiers that can be used to access content associated with the campaign.

Content provider server 265 includes one or more devices capable of receiving, generating, storing, processing, and/or providing information associated with a toll-free data service campaign. For example, content provider server 265 can include a server device (e.g., a host server, a web server, an application server, etc.), a data center device, or a similar device.

Network 270 includes one or more wired and/or wireless networks. For example, network 270 can include a cellular network (e.g., a fifth generation (5G) network, an LTE network, a code division multiple access (CDMA) network, a third generation (3G) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
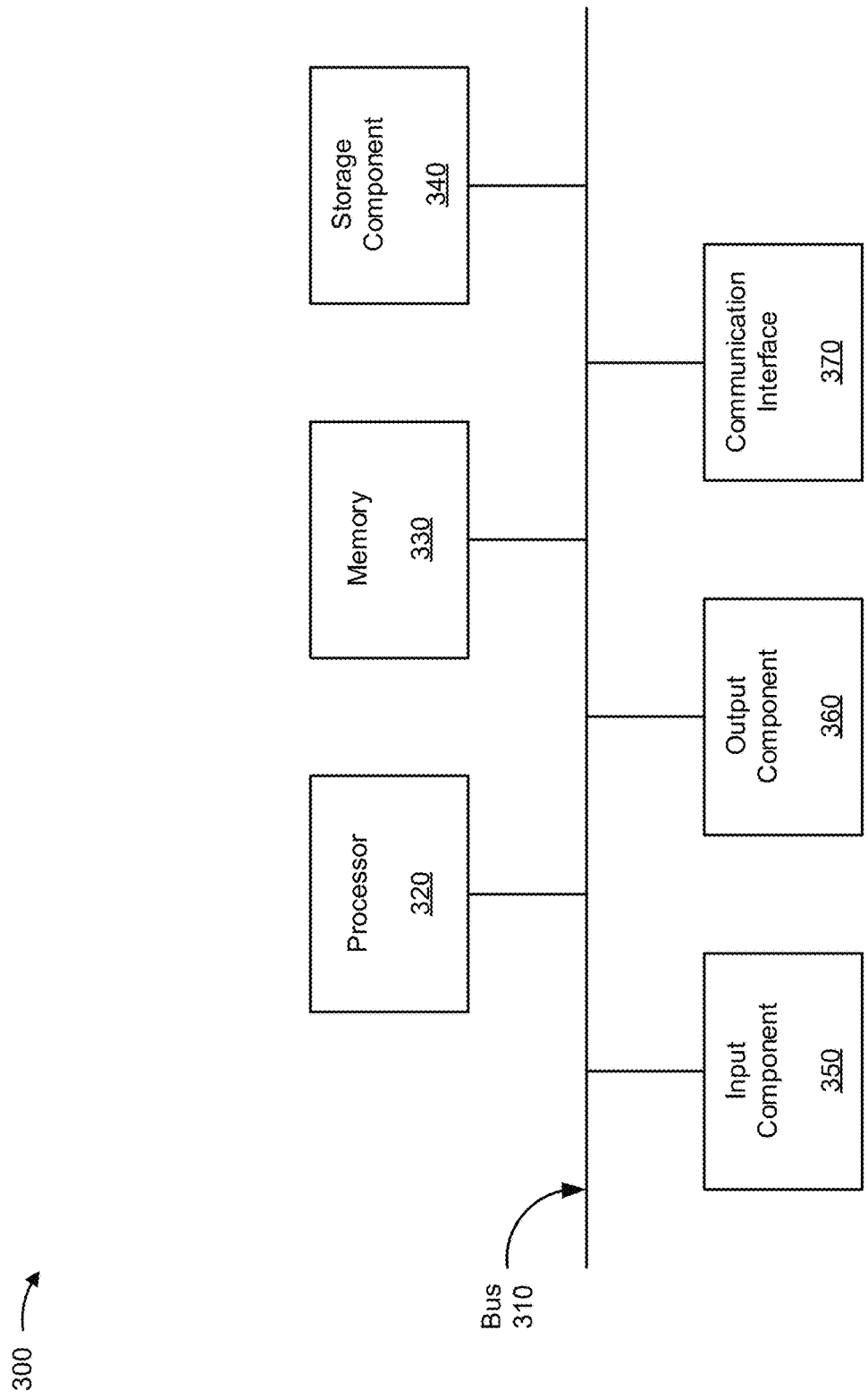
FIG. 3 is a diagram of example components of one or more devices of FIG. 2.

FIG. 3 is a diagram of example components of a device 300. Device 300 can correspond to user device 205, base station 210, MME 215, SGW 220, PGW 225, authorization server 230, NPU 235, usage server 240, proxy server 245, campaign management device 250, AAA 255, campaign input device 260, and/or content provider server 265. In some implementations, user device 205, base station 210, MME 215, SGW 220, PGW 225, authorization server 230, NPU 235, usage server 240, proxy server 245, campaign management device 250, AAA 255, campaign input device 260, and/or content provider server 265 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
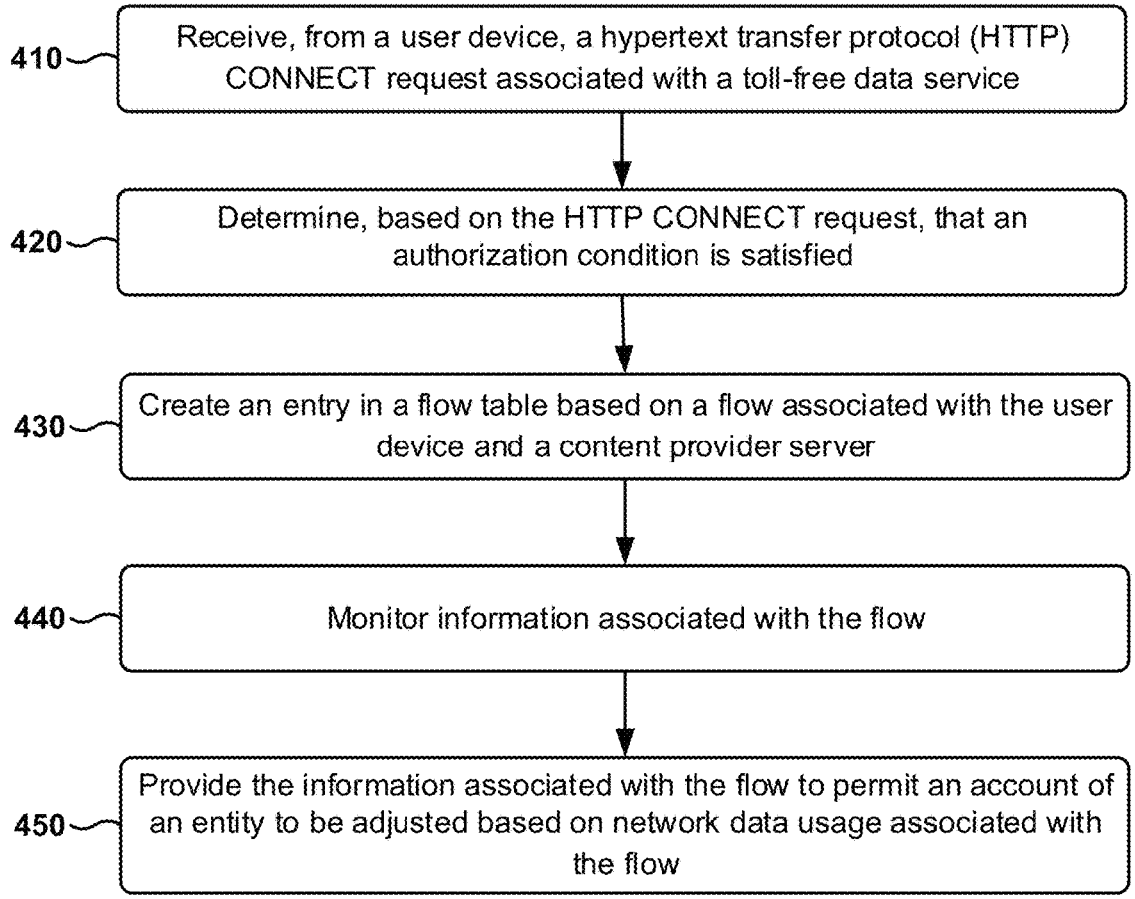
FIG. 4 is a flow chart of an example process for enabling HTTP CONNECT in association with a toll-free data service.

FIG. 4 is a flow chart of an example process 400 for enabling HTTP CONNECT in association with a toll-free data service. In some implementations, one or more process blocks of FIG. 4 can be performed by NPU 235. In some implementations, one or more process blocks of FIG. 4 can be performed by another device or a group of devices separate from or including NPU 235, such as user device 205, base station 210, MME 215, SGW 220, PGW 225, authorization server 230, usage server 240, proxy server 245, campaign management device 250, AAA 255, campaign input device 260, and/or content provider server 265.

As shown in FIG. 4, process 400 can include receiving, from a user device, a hypertext transfer protocol (HTTP) CONNECT request associated with a toll-free data service (block 410). For example, NPU 235 can receive, from user device 205, an HTTP CONNECT request associated with a toll-free data service.

In some implementations, user device 205 can provide, to proxy server 245, an HTTP CONNECT request that requests proxy server 245 to establish a TCP connection with content provider server 265 to enable user device 205 and content provider server 265 to establish a TLS connection. As described elsewhere herein, user device 205 can provide, to NPU 235, the HTTP CONNECT request based on establishing a TCP connection with proxy server 245.

In some implementations, a toll-free data service can correspond to providing content that a content provider wishes to provide to user device 205 for free by subsidizing the cost of network data usage associated with receiving the content. In some implementations, a toll-free data campaign can refer to a campaign by a content provider where the content provider agrees to be charged for network data usage by users of user devices 205 that access the content provided by the content provider.

In some implementations, user device 205 can be associated with a toll-free data service application (e.g., a client application and/or a mobile application) that a content provider can provide, and that users can use (e.g., on user devices 205), to send and/or receive network traffic associated with the content provider's toll-free data service campaign. In some implementations, user device 205 can provide, to authorization server 230, an authorization request associated with a resource identifier (e.g., a URL, a uniform resource identifier (URI), a uniform resource name (URN), or the like) based on executing the toll-free data service application. For example, user device 205 (e.g., the client application) can provide, to authorization server 230, an authorization request based on an API.

In some implementations, the authorization request can include information that identifies the resource identifier. Additionally, or alternatively, the authorization request can include information that identifies an HTTP Secure (HTTPs) CONNECT flag. For example, the HTTPs CONNECT flag can identify that user device 205 is requesting use of the HTTP CONNECT method to establish a connection with content provider server 265.

Additionally, or alternatively, the authorization request can include information that identifies a campaign identifier, such as information that identifies a toll-free data service campaign, a content provider associated with the toll-free data service campaign, or the like. Additionally, or alternatively, the authorization request can include information that identifies a user device identifier of user device 205 (e.g., a mobile directory number (MDN), an International Mobile Subscriber Identity (IMSI), a network address, or the like).

In some implementations, authorization server 230 can receive the authorization request, and validate the authorization request based on a set of campaign rules. For example, the set of campaign rules can include information that identifies a time frame for which the toll-free data service campaign is valid, that identifies network usage that is eligible to be used in association with the toll-free data service campaign (e.g., a byte usage), that identifies whether HTTP CONNECT is eligible to be used in association with the toll-free data service campaign, that identifies whether user device 205 is eligible to participate in the toll-free data service campaign, or the like.

In some implementations, authorization server 230 can provide an authorization response based on validating the authorization request. For example, the authorization response can include information that identifies the resource identifier associated with the authorization request. Additionally, or alternatively, the authorization response can include authorization information, such as information that identifies the campaign identifier, information that identifies that the toll-free data service campaign is valid, or the like.

Additionally, or alternatively, the authorization response can include information that identifies proxy server 245. For example, the authorization response can include information that identifies a network address associated with proxy server 245, a toll-free data service port identifier associated with NPU 235 (e.g., for which user device 205 is to provide the HTTP CONNECT request), or the like. For example, the toll-free data service port identifier can identify a port, of NPU 235, that is associated with toll-free data service network traffic.

In some implementations, authorization server 230 can provide the information that identifies proxy server 245 based on identifying information that identifies the HTTPs CONNECT flag in association with the authorization request. In some implementations, authorization server 230 can determine, based on the set of campaign rules, that user device 205 is eligible to use HTTP CONNECT in association with the toll-free data service, identify information associated with proxy server 245 based on stored information (e.g., information that identifies a list of proxy servers 245), and provide, to user device 205, the information that identifies proxy server 245.

In some implementations, the authorization request can include information that identifies a particular proxy server 245 (e.g., for which user device 205 is requesting to connect). In this case, authorization server 230 can validate whether the particular proxy server 245 is eligible to be used in association with the toll-free data service, and provide information that identifies the particular proxy server 245 based on validating that the particular proxy server 245 is eligible for use.

In some implementations, user device 205 can receive, from authorization server 230, the authorization response, and establish a TCP connection with proxy server 245 based on the authorization response. For example, user device 205 can identify the information that identifies proxy server 245, and initiate a TCP connection with proxy server 245 (e.g., provide a TCP signaling message, such as a synchronization (SYN) message, to proxy server 245). In some implementations, user device 205 and proxy server 245 can perform a three-way handshake procedure to establish the TCP connection (e.g., exchange TCP signaling messages, such as a SYN message, a SYN Acknowledgement (ACK) message, and an ACK message).

In some implementations, NPU 235 can receive, from user device 205 and via the toll-free data service port, TCP signaling messages (e.g., the SYN message and the ACK message), perform a network address translation (NAT) technique, and provide the TCP signaling messages to a particular port of proxy server 245 (e.g., an HTTP port, such as Port 80). In this way, NPU 235 can receive network traffic from user device 205 via the toll-free data service port, and identify that the network traffic can be associated with the toll-free data service.

In some implementations, user device 205 can provide, to proxy server 245, the HTTP CONNECT request based on establishing the TCP connection with proxy server 245. In some implementations, the HTTP CONNECT request can include information that identifies the resource identifier associated with content provider server 265. Additionally, or alternatively, the HTTP CONNECT request can include the authorization information (e.g., that user device 205 received from authorization server 230). In some implementations, user device 205 can include the authorization information in association with the resource identifier (e.g., included in the URL, appended to the URL, or the like). Additionally, or alternatively, user device 205 can include the authorization information in association with another part of a packet associated with the HTTP CONNECT request (e.g., a packet header, a trailer, a payload, or the like).

In some implementations, the HTTP CONNECT request does not include the authorization information. In this case, NPU 235 can identify that the HTTP CONNECT request was received via the toll-free data service port, and determine that the HTTP CONNECT request is associated with a toll-free data service. In this case, and as described elsewhere herein, NPU 235 can validate the HTTP CONNECT request based on a device identifier of user device 205.

As further shown in FIG. 4, process 400 can include determining, based on the HTTP CONNECT request, that an authorization condition is satisfied (block 420). For example, NPU 235 can receive the HTTP CONNECT request and determine, based on the HTTP CONNECT request, that an authorization condition is satisfied.

In some implementations, the authorization condition can be indicative of network data usage, associated with a connection between user device 205 and content provider server 265, being eligible to be used in association with the toll-free data service campaign, can be indicative of user device 205 being eligible to use HTTP CONNECT in association with a toll-free data service, or the like.

In some implementations, NPU 235 can determine that the authorization condition is satisfied based on the authorization information. For example, NPU 235 can identify the authorization information in association with the HTTP CONNECT request, and determine that the authorization condition is satisfied based on the authorization information. In some implementations, authorization server 230 can hash the authorization information using a hashing algorithm, and NPU 235 can de-hash the authorization information using the same hashing algorithm. In this way, authorization server 230 and/or NPU 235 can improve security of the authorization information, and/or reduce a number of instances where user device 205 provides counterfeit authorization information, thereby conserving authorization server 230 and/or NPU 235 computing resources and/or network resources that might have been used for rectifying and/or mitigating the counterfeit use.

Additionally, or alternatively, NPU 235 can determine that the authorization condition is satisfied based on receiving the HTTP CONNECT request via the toll-free data service port, and authorizing the HTTP CONNECT request based on a set of campaign rules. For example, NPU 235 can receive the HTTP CONNECT request via the toll-free data service port, and determine that the HTTP CONNECT request is associated with a toll-free data service campaign. In this case, NPU 235 can determine whether the authorization condition is satisfied based on a resource identifier associated with the HTTP CONNECT request, and/or based on a user device identifier of user device 205.

In some implementations, NPU 235 can identify information that identifies a toll-free data service campaign based on the resource identifier, and determine that the authorization condition is satisfied based on a set of campaign rules (e.g., in a similar manner as described above in connection with block 410 regarding authorization server 230).

Additionally, or alternatively, NPU 235 can determine that the authorization condition is satisfied based on a user device identifier of user device 205. For example, NPU 235 can store information that identifies particular user devices 205 that are eligible to use HTTP CONNECT in association with a toll-free data service, or the like. In some implementations, user device 205 can be authorized to access content associated with multiple content provider servers 265, and a particular account of an entity can be adjusted based on network data usage associated with the particular content provider servers 265. In some implementations, NPU 235 can identify a user device identifier of user device 205, determine that user device 205 is eligible to use HTTP CONNECT in association with the toll-free data service, and determine that the authorization condition is satisfied based on the user device identifier being eligible to use HTTP CONNECT.

In some implementations, NPU 235 can provide, to proxy server 245, the HTTP CONNECT request based on the authorization condition being satisfied. In some implementations, proxy server 245 can receive the HTTP CONNECT request, and establish a TCP connection with content provider server 265. In some implementations, proxy server 245 can identify the resource identifier associated with the HTTP CONNECT request, perform Domain Name System (DNS) resolution to determine a network address associated with content provider server 265, and provide a TCP signaling message (e.g., a TCP SYN message) to content provider server 265 using the network address. Additionally, or alternatively, proxy server 245 and content provider server 265 can perform a three-way handshake procedure to establish the TCP connection.

In some implementations, proxy server 245 can provide, to user device 205, a response based on the HTTP CONNECT request (e.g., a response message identifying that the HTTP CONNECT request was successful, such as an HTTP 200 OK message). For example, the response can identify that proxy server 245 established the TCP connection with content provider server 265, and that proxy server 245 is tunneling network traffic associated with the client-side TCP connection to the server-side connection (e.g., that a TCP tunnel has been established).

In some implementations, user device 205 can receive the response, and establish a Transport Layer Security (TLS) connection with content provider server 265. For example, user device 205 and content provider server 265 can perform a TLS handshake procedure (e.g., can exchange credentials and/or security keys, perform mutual authentication, negotiate various TLS parameters, or the like). In this way, user device 205 and content provider server 265 can establish a TLS connection, thereby increasing communication security between user device 205 and content provider server 265. However, in this way, NPU 235 does not retain visibility into the underlying network traffic between user device 205 and content provider server 265 (e.g., inspect data associated with the network traffic), therefore rendering NPU 235 ineligible to identify network traffic associated with the toll-free data service. Thus, NPU 235 can create an entry in a flow table, and monitor information associated with a flow between user device 205 and content provider server 265, as described below.

As further shown in FIG. 4, process 400 can include creating an entry in a flow table based on a flow associated with the user device and a content provider server (block 430). For example, NPU 235 can create an entry in a flow table based on a flow associated with user device 205 and content provider server 265.

In some implementations, a flow can include network traffic (e.g., a sequence of packets) that includes one or more shared values. For example, each packet associated with the flow can include a common tuple in the packet header (e.g., a five-tuple, such as a source address, a source port, a destination port, and/or a protocol). As used herein, a packet can refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

In some implementations, NPU 235 can store, in a flow table (e.g., a data structure, such as a cache, a hash table, or the like), information associated with a flow. For example, the flow table can include multiple fields that store information associated with a flow, such as five-tuple information (e.g., a hashed five-tuple), a packet count, a byte count, a time of creation of the flow, or the like. Additionally, or alternatively, the flow table can include information that identifies the appropriate account to be adjusted for network data usage associated with the flow. For example, NPU 235 can identify a content provider based on the five-tuple information, the authorization information, or the like, and store information that identifies the content provider.

In some implementations, an entry in the flow table can correspond to a particular flow. For example, NPU 235 can create an entry in the flow table for the flow between user device 205 and content provider server 265. In this way, NPU 235 can monitor information associated with the flow, and provide flow records that identify network data usage associated with the flow, as described below.

As further shown in FIG. 4, process 400 can include monitoring information associated with the flow (block 440), and providing the information associated with the flow to permit an account of an entity to be adjusted based on network data usage associated with the flow (block 450). For example, NPU 235 can monitor information associated with the flow, and provide the information, to usage server 240, to permit an account of an entity to be adjusted based on network data usage associated with the flow.

In some implementations, NPU 235 can monitor the flow based on updating values associated with particular fields of the flow table. For example, NPU 235 can update a byte count, a packet count, or the like. In some implementations, NPU 235 can provide, to usage server 240, the information associated with the flow. For example, NPU 235 can generate a flow record, and provide the flow record to usage server 240. In some implementations, a flow record can include information associated with the flow table.

In some implementations, NPU 235 can provide a flow record to usage server 240 based on an interval (e.g., every five minutes, every ten minutes, every day, etc.). For example, NPU 235 can generate a flow record based on the interval, and provide the flow record to usage server 240. Additionally, or alternatively, NPU 235 can generate a flow record based on a status of the TLS connection. For example, NPU 235 can provide a flow record based on an expiration and/or termination of the TLS connection between user device 205 and content provider server 265. In this way, an account of an entity (e.g., the content provider) can be adjusted based on network data usage associated with the flow.

In this way, implementations described herein enable user device 205 and content provider server 265 to establish a TLS connection and tunnel network traffic through proxy server 245. Additionally, implementations described herein enable NPU 235 to identify network data usage that is to be charged to a particular account of an entity based on a flow between user device 205 and content provider server 265. Implementations described herein enable network data usage associated with a toll-free data service to be authorized based on signaling associated with establishing a TLS connection, and network data usage to be monitored in association with the TLS connection. In this way, NPU 235 and/or authorization server 230 can authorize a reduced number of requests (e.g., an HTTP CONNECT request and/or an authorization request) rather than authorizing multiple requests (e.g., multiple HTTP requests, or the like) for toll-free content. In this way, implementations described herein conserve user device 205 and network device processor and/or memory resources, and/or conserve network resources.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
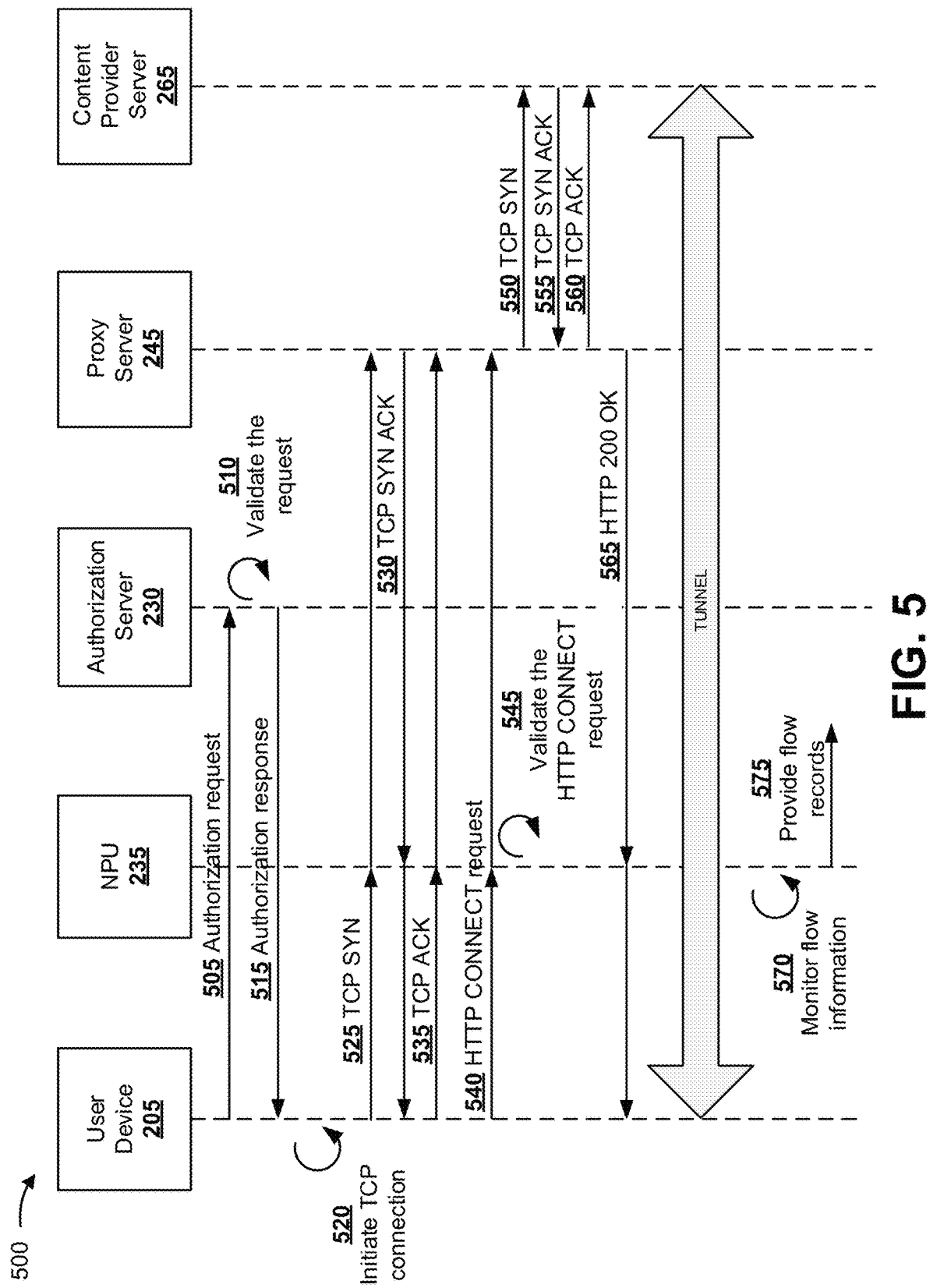
FIG. 5 is a diagram of a call flow of example operations capable of being performed by one or more devices of FIG. 2.

FIG. 5 is a diagram of a call flow of example operations capable of being performed by one or more devices of FIG. 2. For example, FIG. 5 is a call flow diagram of an example call flow 500 for enabling HTTP CONNECT in association with a toll-free data service. As shown in FIG. 5, and by reference number 505, user device 205 can provide an authorization request to authorization server 230. As shown by reference number 510, authorization server 230 can validate the authorization request based on campaign information. As shown by reference number 515, authorization server 230 can provide, to user device 205, an authorization response based on validating the request. For example, the authorization response can include information that identifies proxy server 245 and/or authorization information. As shown by reference number 520, user device 205 can initiate a TCP connection with proxy server 245 based on the authorization response. For example, as shown by reference number 525, user device 205 can provide, to proxy server 245, a TCP SYN message. As shown by reference number 530, proxy server 245 can provide, to user device 205, a TCP SYN ACK message. As shown by reference number 535, user device 205 can provide, to proxy server 245, a TCP ACK message.

As shown by reference number 540, user device 205 can provide, to proxy server 245, an HTTP CONNECT request based on establishing the TCP connection with proxy server 245. NPU 235 can receive the HTTP CONNECT request, and, as shown by reference number 545, validate the HTTP CONNECT request. Additionally, NPU 235 can provide, to proxy server 245, the HTTP CONNECT request based on validating the HTTP CONNECT request.

As shown by reference number 550, proxy server 245 can provide, to content provider server 265, a TCP SYN message. For example, proxy server 245 can receive the HTTP CONNECT request, and provide the TCP SYN message to establish a TCP connection with content provider server 265. As shown by reference number 555, content provider server 265 can provide, to proxy server 245, a TCP SYN ACK message. As shown by reference number 560, proxy server 245 can provide, to content provider server 265, a TCP ACK message.

As shown by reference number 565, proxy server 245 can provide, to user device 205, an HTTP 200 OK message. For example, proxy server 245 can provide the HTTP 200 OK message based on establishing the TCP connection with content provider server 265.

In some implementations, user device 205 and content provider server 265 can establish a TLS connection (e.g., shown as a tunnel). As shown by reference number 570, NPU 235 can monitor flow information. For example, NPU 235 can identify network traffic associated with the TLS connection, and update information associated with a flow table. As shown by reference number 575, NPU 235 can provide, to another device, flow records. For example, NPU 235 can provide, to another device, information associated with a flow between user device 205 and content provider server 265 (e.g., network data usage). In this way, a particular entity can be charged for network data usage associated with the flow.

As indicated above, FIG. 5 is provided merely as an example. Other examples are possible and can differ from what was described with regard to FIG. 5. While a particular series of operations and/or data flows have been described above with regard to FIG. 5, the order of the operations and/or data flows can be modified in other implementations. Further, non-dependent operations can be performed in parallel.

Implementations described herein enable HTTP CONNECT to be used in association with a toll-free data service. For example, implementations described herein enable a user device to establish a TLS connection with a content provider server, and a network device to monitor information associated with the TLS connection (e.g., flow information). In this way, the network device can store information that enables an account of an entity to be adjusted based on network data usage associated with the TLS connection. Implementations described herein reduce a number of authorization requests associated with a toll-free data service. For example, implementations described herein enable network devices to authorize a user device based on signaling messages associated with establishing a TLS connection, and monitor flow information associated with the TLS connection rather than authorizing multiple content requests (e.g., respective HTTP requests using particular URLs). In this way, implementations described herein conserve network device and/or user device memory and/or processor resources, and/or conserve network resources.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Certain user interfaces have been described herein and/or shown in the figures. A user interface can include a graphical user interface, a non-graphical user interface, a text-based user interface, etc. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information.

Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive, from a user device, a hypertext transfer protocol (HTTP) CONNECT request associated with a toll-free data service,
the toll-free data service being associated with a campaign of a content provider,
the user device to establish a first transmission control protocol (TCP) connection with a proxy server, and
the HTTP CONNECT request to request the proxy server to establish a second TCP connection with a content provider server;
receive, from the user device and via a port of the device, a TCP signaling message,
the user device to provide the TCP signaling message to establish the first TCP connection;
identify, based on the HTTP CONNECT request, information that identifies a resource identifier,
the resource identifier including an authorization URL associated with the content provider server;
determine, based on the information that identifies the resource identifier and the port of the device, that an authorization condition is satisfied;
store information associated with a flow between the user device and the content provider server based on the authorization condition being satisfied,
the information associated with the flow being stored in a flow table,
the user device and the content provider server to establish a transport layer security (TLS) connection based on the first TCP connection and the second TCP connection, and
the flow being associated with network traffic that includes one or more shared values,
the one or more shared values being associated with information to identify the content provider server;
monitor the flow between the user device and the content provider server based on updating the one or more shared values associated with particular fields of the flow table;
provide, to another device, a flow record that identifies a number of bytes associated the flow; and
provide, based on the flow record, the information associated with the flow to permit an account of an entity to be charged in association with the toll-free data service.

2. The device of claim 1, where the one or more processors are further to:
identify, based on the HTTP CONNECT request, a set of campaign rules associated with the toll-free data service; and
where the one or more processors, when determining that the authorization condition is satisfied, are to:
determine that the authorization condition is satisfied based on the set of campaign rules.

3. The device of claim 1, where the one or more processors are further to:
determine a user device identifier, of the user device, based on the HTTP CONNECT request; and
where the one or more processors, when determining that the authorization condition is satisfied, are to:
determine that the authorization condition is satisfied based on the user device identifier.

4. The device of claim 1, where the one or more processors are further to:
receive network traffic associated with the TLS connection;
identify information that identifies the user device and the content provider server based on the network traffic; and
where the one or more processors, when storing the information associated with the flow, are to:
store the information associated with the flow based on the information that identifies the user device and the content provider server.

5. The device of claim 1, where the one or more processors are further to:
identify authorization information associated with the HTTP CONNECT request; and
where the one or more processors, when determining that the authorization condition is satisfied, are to:
determine that the authorization condition is satisfied based on the authorization information,
the user device to receive the authorization information from an authorization server, and
the user device to provide the authorization information in association with the HTTP CONNECT request.

6. The device of claim 1, where the one or more shared values includes:
shared five-tuple information including:
a source address,
a source port,
a destination address,
a destination port identifier, and
a protocol.

7. The device of claim 1, where the flow record further identifies network data usage associated with the flow.

8. A non-transitory computer-readable medium storing instructions, the instructions comprising:
one or more instructions that, when executed by one or more processors of a device, cause the one or more processors to:
receive, from a user device, a hypertext transfer protocol (HTTP) CONNECT request associated with a toll-free data service,
the toll-free data service being associated with a campaign of a content provider,
the user device to establish a first connection with a proxy server, and
the HTTP CONNECT request to request the proxy server to establish a second connection with a content provider server;
receive, from the user device and via a port of the device, a TCP signaling message,
the user device to provide the TCP signaling message to establish the first connection;
identify, based on the HTTP CONNECT request, information that identifies a resource identifier,
the resource identifier including an authorization URL associated with the content provider server;
determine, based on the information that identifies the resource identifier and the port of the device, that an authorization condition is satisfied;
store information associated with a flow between the user device and the content provider server based on the authorization condition being satisfied,
the information associated with the flow being stored in a flow table,
the user device and the content provider server to establish a third connection based on the first connection and the second connection, and
the flow being associated with network traffic that includes one or more shared values,
the one or more shared values being associated with information to identify the content provider server;
monitor the flow between the user device and the content provider server based on updating the one or more shared values associated with particular fields of the flow table;
provide, to another device, a flow record that identifies a number of bytes associated the flow; and
provide, based on the flow record, the information associated with the flow to permit an account of an entity to be charged in association with the toll-free data service.

9. The non-transitory computer-readable medium of claim 8, where the one or more instructions, when executed by the one or more processors, further cause the one or more processors to:
determine a user device identifier of the user device; and
where the one or more instructions, that cause the one or more processors to determine that the authorization condition is satisfied, cause the one or more processors to:
determine that the authorization condition is satisfied based on the user device identifier.

10. The non-transitory computer-readable medium of claim 8, where the one or more instructions, when executed by the one or more processors, further cause the one or more processors to:
identify a particular campaign, associated with the toll-free data service, based on the HTTP CONNECT request;
identify a set of campaign rules based on the particular campaign; and
where the one or more instructions, that cause the one or more processors to determine that the authorization condition is satisfied, cause the one or more processors to:
determine that the authorization condition is satisfied based on the set of campaign rules.

11. The non-transitory computer-readable medium of claim 8, where the one or more instructions, when executed by the one or more processors, further cause the one or more processors to:
identify authorization information that is associated with the HTTP CONNECT request; and
where the one or more instructions, that cause the one or more processors to determine that the authorization condition is satisfied, cause the one or more processors to:
determine that the authorization condition is satisfied based on the authorization information.

12. The non-transitory computer-readable medium of claim 8, where the one or more instructions, when executed by the one or more processors, further cause the one or more processors to:
identify an expiration of the third connection; and
where the one or more instructions, that cause the one or more processors to provide the information associated with the flow, are to:
provide the information associated with the flow based on the expiration of the third connection.

13. The non-transitory computer-readable medium of claim 8, where the third connection is a transport layer security connection.

14. The non-transitory computer-readable medium of claim 8, where the one or more instructions, when executed by the one or more processors, further cause the one or more processors to:
identify a particular campaign, associated with the toll-free data service, based on the HTTP CONNECT request; and
identify authorization information associated with the HTTP CONNECT request; and
where the authorization information includes one or more of:
information that identifies that the particular campaign associated with the toll-free data service is valid, or
information that identifies that the user device is eligible to participate in the particular campaign associated with the toll-free data service.

15. A method, comprising:
receiving, by a device and from a user device, a hypertext transfer protocol (HTTP) CONNECT request associated with a toll-free data service, the toll-free data service being associated with a campaign of a content provider,
the user device to establish a first transmission control protocol (TCP) connection with a proxy server, and
the HTTP CONNECT request to request the proxy server to establish a second TCP connection with a content provider server;
receiving, by the device, from the user device, and via a port of the device, a TCP signaling message,
the user device to provide the TCP signaling message to establish the first TCP connection;
identifying, by the device and based on the HTTP CONNECT request, information that identifies a resource identifier,
the resource identifier including an authorization URL associated with the content provider server;
determining, by the device and based on the information that identifies the resource identifier and the port of the device, that an authorization condition is satisfied;
storing, by the device, information associated with a flow between the user device and the content provider server based on the authorization condition being satisfied,
the information associated with the flow being stored in a flow table,
the user device and the content provider server to exchange traffic based on a transport layer security connection associated with the first TCP connection and the second TCP connection, and
the flow being associated with network traffic that includes one or more shared values,
the one or more shared values being associated with information to identify the content provider server;
monitoring, by the device, the flow between the user device and the content provider server based on updating the one or more shared values associated with particular fields of the flow table;
providing, by the device and to another device, a flow record that identifies a number of bytes associated with the flow; and
providing, by the device and based on the flow record, the information associated with the flow to permit an account of an entity to be charged in association with the toll-free data service.

16. The method of claim 15, further comprising:
identifying authorization information based on the HTTP CONNECT request,
the user device to receive, from an authorization server, the authorization information, and
the user device to provide the authorization information in association with the HTTP CONNECT request; and
where determining that the authorization condition is satisfied comprises:
determining that the authorization condition is satisfied based on the authorization information.

17. The method of claim 15, further comprising:
determining a user device identifier of the user device based on the HTTP CONNECT request; and
where determining that the authorization condition is satisfied comprises:
determining that the authorization condition is satisfied based on the user device identifier.

18. The method of claim 15, further comprising:
receiving information that identifies the proxy server based on the HTTP CONNECT request; and
where determining that the authorization condition is satisfied comprises:
determining that the authorization condition is satisfied based on the information that identifies the proxy server.

19. The method of claim 15, where the one or more shared values includes:
shared five-tuple information including:
a source address,
a source port,
a destination address,
a destination port identifier, and
a protocol.

20. The method of claim 15, where the information associated with the flow includes one or more of:
five-tuple information,
a packet, or
a byte.

* * * * *